(12) United States Patent
Essabar et al.

(10) Patent No.: US 7,512,383 B2
(45) Date of Patent: Mar. 31, 2009

(54) TRANSMIT-RECEIVE SWITCHING IN WIRELESS HEARING AIDS

(75) Inventors: Mohamad Essabar, Copenhagen (DK); John David Terry, Santa Rosa, CA (US)

(73) Assignees: Starkey Laboratories, Inc., Eden Prairie, MN (US); Oticon A/S, Hellerup (DK)

( * ) Notice: Subject to any disclaimer, the term of this patent is extended or adjusted under 35 U.S.C. 154(b) by 825 days.

(21) Appl. No.: 10/723,890

(22) Filed: Nov. 26, 2003

(65) Prior Publication Data

US 2005/0111682 A1 May 26, 2005

(51) Int. Cl.
*H04B 1/44* (2006.01)

(52) U.S. Cl. .............................. 455/78; 455/82; 455/83; 455/193.1; 455/197.3; 381/312; 381/331; 331/59; 333/100

(58) Field of Classification Search ............. 455/78–83, 455/193.1, 193.2, 195.1, 197.3; 381/312, 381/331, 315; 331/59, 117, 179; 333/100, 333/101
See application file for complete search history.

(56) References Cited

U.S. PATENT DOCUMENTS

| | | | | |
|---|---|---|---|---|
| 3,733,608 A | * | 5/1973 | McGhay et al. ............. 370/339 |
| 3,916,344 A | * | 10/1975 | Enderby ................. 331/116 R |
| 4,334,315 A | | 6/1982 | Ono et al. |
| 4,763,076 A | * | 8/1988 | Arakawa et al. ............ 324/322 |
| 4,786,907 A | * | 11/1988 | Koelle ......................... 342/51 |
| 5,307,349 A | * | 4/1994 | Shloss et al. ................ 370/442 |
| 5,317,330 A | * | 5/1994 | Everett et al. .............. 343/867 |
| 5,345,473 A | | 9/1994 | Berg |
| 5,697,069 A | * | 12/1997 | Bohm et al. .................. 455/83 |
| 5,982,243 A | * | 11/1999 | Pope ............................ 331/59 |
| 5,999,061 A | * | 12/1999 | Pope et al. ..................... 331/49 |
| 6,163,228 A | * | 12/2000 | Pope ....................... 331/117 R |
| 6,342,844 B1 | * | 1/2002 | Rozin ......................... 340/933 |

(Continued)

FOREIGN PATENT DOCUMENTS

DE          1566865 A1    5/1970

(Continued)

OTHER PUBLICATIONS

"International Search Report for corresponding PCT Application No. PCT/US2004/041347", (Apr. 13, 2005), 4 pgs.

*Primary Examiner*—Minh D Dao
(74) *Attorney, Agent, or Firm*—Schwegman, Lundberg & Woessner, P.A.

(57) ABSTRACT

Systems, devices and methods are provided to switch between transmit and receive modes in wireless hearing aids. One aspect relates to an apparatus for use within a communication system that has an inductive coil connected to a tuning capacitor at a node. An amplifier is connected to the node through a DC blocking capacitor to receive an induced signal in the inductive coil in a receive mode. A driver energizes the inductive coil with a driven signal in a transmit mode. According to various embodiments, the apparatus transforms the inductive coil, the tuning capacitor and the DC blocking capacitor into an equivalent series resonant circuit to reduce an inductive load in the transmit mode, and transforms the inductive coil, the tuning capacitor and the DC blocking capacitor into an equivalent parallel resonant circuit to increase an inductive load in the receive mode.

26 Claims, 8 Drawing Sheets

U.S. PATENT DOCUMENTS

| | | | |
|---|---|---|---|
| 6,426,680 B1 * | 7/2002 | Duncan et al. | 331/34 |
| 6,583,999 B1 * | 6/2003 | Spindler et al. | 363/98 |
| 6,768,802 B1 * | 7/2004 | Baechler | 381/315 |
| 2006/0229046 A1 * | 10/2006 | Bult et al. | 455/252.1 |
| 2007/0041601 A1 * | 2/2007 | Essabar | 381/312 |

FOREIGN PATENT DOCUMENTS

| | | |
|---|---|---|
| EP | 0926855 A1 | 6/1999 |

* cited by examiner the present subject matter and will be understood by reading and studying the following specification. Various aspects and embodiments of the present subject matter provide a TR switch to configure inductive (L) and capacitive (C) components of the antenna element into a series resonant circuit in a transmit mode and a parallel resonant circuit in a receive mode. The series LC circuit has a low impedance at resonance, which allows a high resonant current into the conductor during the transmit mode. The parallel LC circuit has a high impedance at resonance to reduce signal loss of induced signals before it is amplified. The series and parallel circuit use the same inductor and capacitors. Thus, the space and cost of the circuitry remains small. Additionally, the present subject matter protects integrated circuits (IC) from excessive voltage generated in the antenna during the transmit mode, and has a frequency shift between the receive mode and transmit modes that is acceptably small.

TRANSMIT-RECEIVE SWITCHING IN WIRELESS HEARING AIDS

TECHNICAL FIELD

This application relates generally to communication systems, and, more particularly, to systems, devices and methods for switching between a transmit mode and a receive mode in a wireless communication system such as those used in wireless hearing aids.

BACKGROUND

Some wireless communication systems include a transmit-receive switch, hereinafter referred to as a TR switch, to transmit and receive signals using the same antenna. Examples of such wireless communications include magnetic field based communication systems (also referred to herein as inductive communication systems) having a single inductive coil. In a transmit mode, the inductive coil is energized to transmit a signal through a resulting time-varying magnetic field. In a receive mode, the inductive coil induces a voltage when in the presence of a time-varying magnetic field that is representative of a signal contained in the field.

The frequency of the time-varying magnetic field for a transmitted signal corresponds with the resonant frequency of the transmitting circuit. A strong signal is transmitted from the antenna by energizing the coil with a large current at the resonant frequency. The receiving circuit has a resonant frequency that corresponds to the frequency of the time-varying magnetic field that contains the signal to be received. It is desired to minimize degradation of the received signal induced in the coil before it is amplified for signal processing circuitry.

It is desired to enhance the ability of wireless communication systems, such as wireless hearing aids, to efficiently transmit and receive signals. Additionally, it is desired to reduce the cost and physical size of the system by reducing the number of components in the wireless communication system.

There is a need in the art to provide wireless communication systems with a TR switch that improves the ability to efficiently transmit and receive signals using a single antenna.

SUMMARY

The above-mentioned problems are addressed by the present subject matter and will be understood by reading and studying the following specification. Various aspects and embodiments of the present subject matter provide a TR switch to configure inductive (L) and capacitive (C) components of the antenna element into a series resonant circuit in a transmit mode and a parallel resonant circuit in a receive mode. The series LC circuit has a low impedance at resonance, which allows a high resonant current into the conductor during the transmit mode. The parallel LC circuit has a high impedance at resonance to reduce signal loss of induced signals before it is amplified. The series and parallel circuit use the same inductor and capacitors. Thus, the space and cost of the circuitry remains small. Additionally, the present subject matter protects integrated circuits (IC) from excessive voltage generated in the antenna during the transmit mode, and has a frequency shift between the receive mode and transmit modes that is acceptably small.

One aspect of the present subject matter relates to an apparatus for use within a communication system. The communication system has an antenna circuit with an inductive coil and a tuning capacitor connected to the inductive coil at a node, also referred to as a center node or signal pickup node. The communication system includes an amplifier connected to the node through a DC blocking capacitor to receive an induced signal in the inductive coil in a receive mode, and further includes a driver connected to the antenna circuit to energize the inductive coil with a driven signal in a transmit mode. According to various embodiments, the apparatus comprises means to transform the inductive coil, the tuning capacitor and the DC blocking capacitor into a series resonant circuit to reduce an inductive load in the transmit mode. The apparatus further comprises means to transform the inductive coil, the tuning capacitor and the DC blocking capacitor into a parallel resonant circuit to increase an inductive load in the receive mode.

One aspect of the present subject matter relates to a communication system. The various embodiments, the communication system includes an antenna element having a first terminal, a second terminal and a node, a DC blocking capacitor connected to the node, and integrated circuitry. The antenna element includes an inductive coil connected between the first terminal and the node and a tuning capacitor connected between the second terminal and the node. The integrated circuitry includes an amplifier connected to the node of the antenna through the DC blocking capacitor to receive a first communication signal induced in the inductive coil in a receive mode, a driver to energize the inductive coil with a second communication signal in a transmit mode, and a TR switch. The TR switch is responsive to a transmit-receive (TR) control signal to pull the first and second terminals of the antenna element to a reference potential during the receive mode. The TR switch is responsive to the TR control signal to operably connect the driver to at least one of the first and second terminals of the antenna element and energize the inductive coil during the transmit mode.

One aspect of the present subject matter relates to a method for switching between a transmit mode and a receive mode in a wireless communication system that has a single antenna element and a DC blocking capacitor connected between an amplifier and a node of the antenna element. According to various embodiments of the method, a mode of operation for the communication system is determined. The antenna element is transformed into a high-impedance parallel resonant circuit in a receive mode, and is transformed into a low-impedance series resonant circuit in a transmit mode.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

Figure 1:
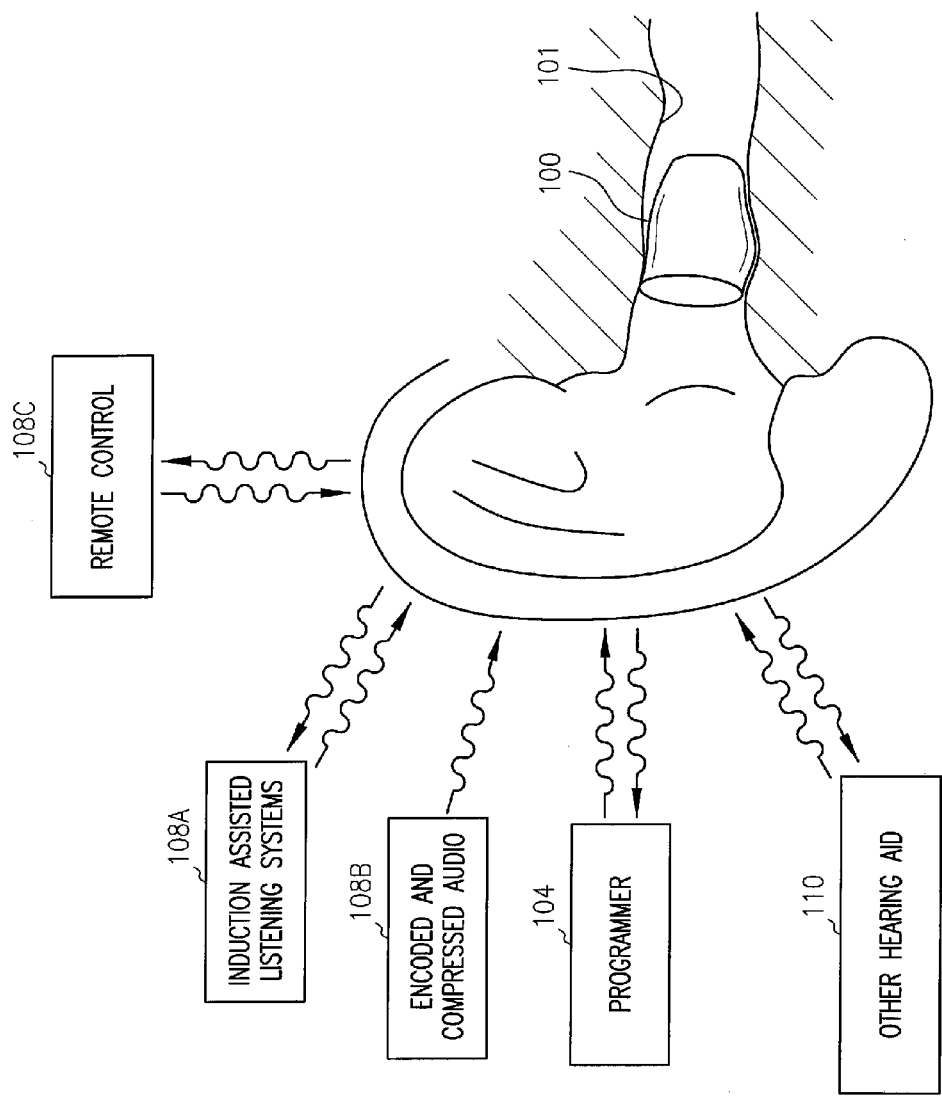
FIG. 1 illustrates a hearing aid device, according to various embodiments of the present subject matter.

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope of the present subject matter is defined only by the appended claims, along with the full scope of legal equivalents to which such claims are entitled FIG. 1 illustrates a hearing aid device, according to various embodiments of the present subject matter. The illustrated hearing aid device 100 is an in-the-ear hearing aid that is positioned completely in the ear canal 102. The present subject matter is not so limited, however. In addition to the illustrated in-the-ear style, the features of the present subject matter can be used in other styles of hearing assistance devices, including half-shell, in-the-canal, behind-the-ear, over-the-ear, eyeglass mount, implants, and body worn hearing aids, and further can be used in noise-protection earphones, headphones, and the like. Hearing aids, as used herein, refer to any device that aids a person's hearings, for example, devices that amplify sound, devices that attenuate sound, and devices that deliver sound to a specific person such as headsets for portable music players or radios.

Furthermore, the present subject matter provides advantages for other wireless communications systems that use a single antenna element and a TR switch to configure the antenna to transmit a signal or receive a signal without requiring additional, relatively large and costly electronic components such as capacitors. Thus, the present subject matter is useful in efforts to further miniaturize and reduce costs of wireless communications systems.

Referring again to FIG. 1, a wireless communication system in the hearing aid 100 is adapted to communicate with one or more devices. In various embodiments, the hearing aid 100 uses a magnetic field based wireless communication system to communicate with an external programmer 104. The programmer is able to adjust the hearing aid settings such as mode, volume and the like, to download a complete hearing aid program, and to receive data from the hearing aid for diagnostics, reporting and the like.

According to various embodiments, the wireless communication system is based on a magnetic principle that uses a carrier frequency and amplitude modulation. Various embodiments implement a carrier frequency of approximately 4 MHz. However, other frequencies can be used as the carrier frequency. Various embodiments modulate using on/off keying, where the carrier is ON for a digital "1" and is OFF for a digital "0." In on/off keying, ON corresponds to approximately 100% of the amplitude and OFF corresponds to approximately 0% of the amplitude. In one example of another amplitude modulation technique, a digital "1" corresponds to 100% of the amplitude and a digital "0" corresponds to 50% of the amplitude. Other amplitude modulation techniques can be used to transmit the digital data, and thus are within the scope of the present subject matter. Thus, embodiments of the wireless communication system include a digital system which converts an analog signal to a digital signal. The system has a limited bandwidth. Thus, the digital system further encodes and compresses the digital signal for transmission.

In various embodiments, the hearing aid 100 uses a magnetic field based wireless communication system to communicate with an induction assisted listening system 108A. In various embodiments, the hearing aid 100 uses a magnetic field based wireless communication system to communicate with a device that provides encoded and compressed audio 108B. In various embodiments, the hearing aid 100 uses a magnetic field based wireless communication system to communicate with a remote control device 108C. In various embodiments, the hearing aid 100 uses a magnetic field based wireless communication system to communicate with another hearing aid 110.

Figure 2:
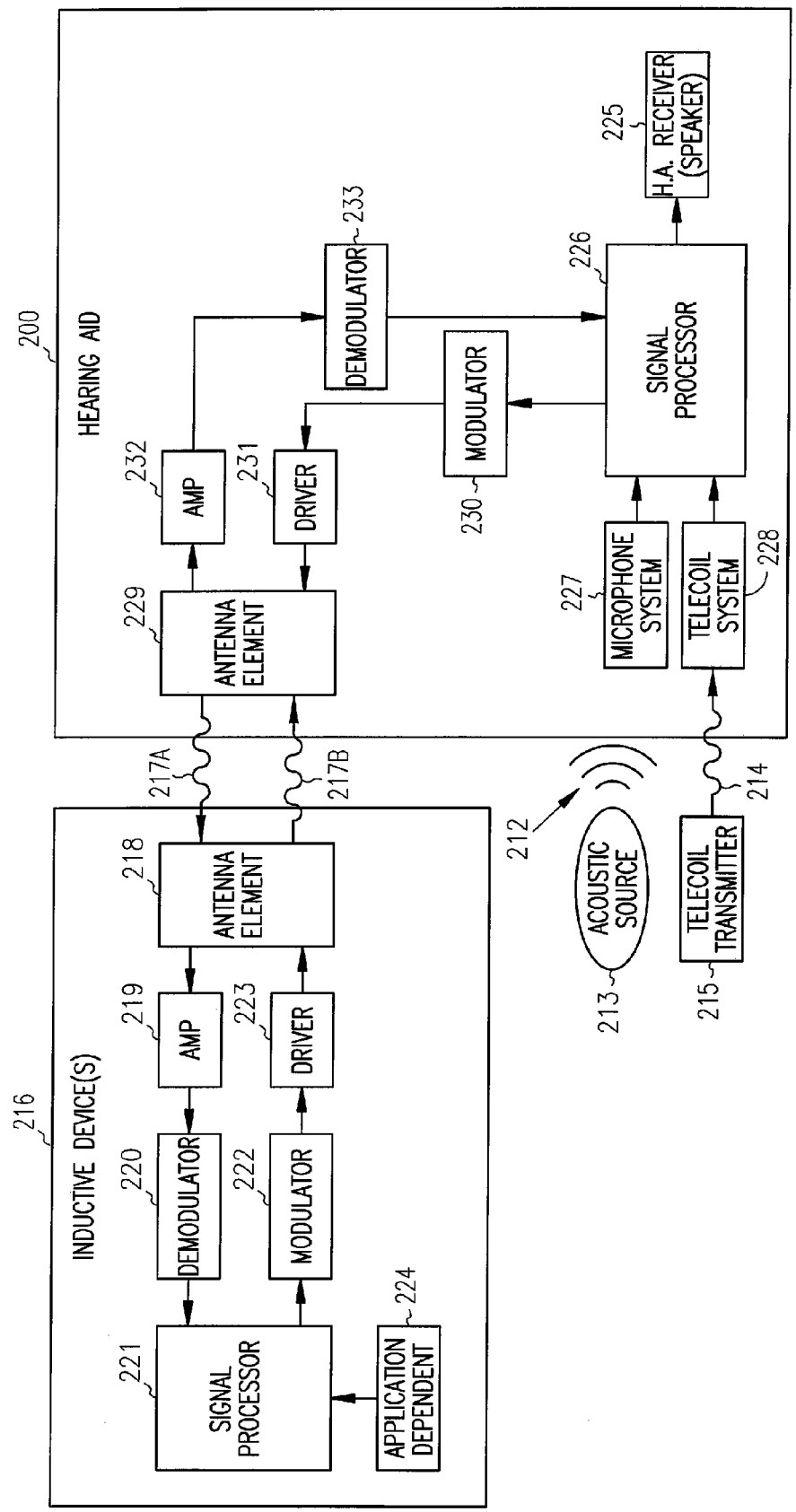
FIG. 2 illustrates a hearing aid, according to various embodiments of the present subject matter.

FIG. 2 illustrates a hearing aid, according to various embodiments of the present subject matter. A wearer is capable of wearing the hearing aid device 200 to aid hearing in an ear. In the illustrated embodiment, the hearing aid device 200 is adapted to receive acoustic signals 212 (such as speech or other sound) from an acoustic source 213, and further is adapted to receive a signal 214 from a telecoil transmitter 215. The acoustic source 213 is a source of sound, as normally perceived by an ear such as a person talking and the like. Examples of telecoil transmitters 215 include, but are not limited to, telephones and some types of programmers.

The environment of the illustrated system includes inductive device(s) 216. Examples of induction devices 216 include programmers for hearing aids, and other hearing aid devices. The present subject matter is not limited to any particular type of inductive device(s) 216. The hearing aid 200 and the inductive devices(s) 216 communicate with each other through a modulated magnetic field 217A and 217B. In general, the inductive device(s) 216 include an antenna element 218 for use to receive signal 217A and transmit signal 217B. The signal representative of the received signal 217A is amplified using an amplifier 219, is demodulated using a demodulator 220 and is provided to signal processor 221. The signal processor 226 provides various signal processing functions which, according to various embodiments, include noise reduction, amplification, frequency response, and/or tone control. A signal representative of a signal to be transmitted to the hearing aid 200 is transmitted from the signal processor 221, is modulated using a modulator 222, and is driven to the antenna element using a driver 223. The inductive device(s) further include application dependent circuitry 224.

In the illustrated embodiment, the hearing aid device 200 includes a hearing aid receiver 225 (or speaker), a signal processor 226, a microphone system 227 for use to receive acoustic signals 212, a telecoil system 228 for use to receive signal 214 from a telecoil transmitter 215, and an antenna element 234 for use to transmit and receive inductive signals 217A and 217B. The microphone system 227 is capable of detecting the acoustic signal 212 and providing a representative signal to the signal processing circuit 227. The telecoil system 228 is capable of receiving a signal 214 from the telecoil transmitter 215 and providing a representative signal to the signal processor 226. The hearing aid 200 in the illustrated embodiment further includes a modulator 230 and driver 231, which in conjunction with the antenna element 234, is used to transmit signal 217A (an amplitude modulated inductive signal at a carrier frequency to transmit digital data) from the hearing aid 200 to the inductive device(s) 216. The hearing aid 200 in the illustrated embodiment further includes an amplifier 232 and a demodulator 233, which in conjunction with the antenna element 234, is used to receive signal 217B (an amplitude modulated inductive signal at a carrier frequency to transmit digital data) and provide a representative signal to the signal processor 226.

The illustrated hearing aid is capable of performing a number of functions. Some of these functions are identified here as examples. These examples are not intended to be an exhaustive list of the functions of the hearing aid. The wearer of the illustrated hearing aid 200 is capable of programming the volume (the amplitude of signal to the receiver 225) while listening to a person talking and/or any other acoustic signal 212. Additionally, the hearing aid 200 is capable of receiving digital audio through signal 217B that can be heard by the wearer of the hearing aid 200 without the acoustic sound or that can be superimposed with representative acoustic signals such that both the acoustic sound and the digital audio are heard by the wearer of the hearing aid 200.

One of ordinary skill in the art will understand that the antenna element 229 is an RLC circuit that has a resonant frequency. The following includes some characterizations of resonant RLC circuits when the resistive (R), inductive (L) and capacitive (C) components are connected in series and in parallel.

In a resonant RLC circuit connected in a series configuration, the impedances of the coil and the capacitor cancel each other out, such that the current and voltage are in phase. The impedance of the circuit equals the resistance (R) such that the impedance is minimum. The current and power dissipation is maximum. These characteristics are desirable for an antenna in a transmit mode in order to efficiently transmit a signal from the antenna.

In a resonant RLC circuit connected in a parallel configuration, the impedance of the combination of the parallel coil and the capacitor are greatest. The current and voltage are in phase. The current is minimum and the power dissipation is minimum. These characteristics are desirable for an antenna in a receive mode so that a received signal is not unduly attenuated before the signal is detected and amplified.

The present subject matter transforms the arrangement of components in the antenna element to a first arrangement in a transmit mode and to a second arrangement in a receive mode. The first arrangement possesses the good transmission characteristics of a series resonant RLC, and the second arrangement possesses the good reception characteristics of a parallel resonant RLC. One of ordinary skill in the art will understand the advantages of the present subject matter upon reading and understanding the description provided below with respect to FIGS. 3-13.

Figure 3:
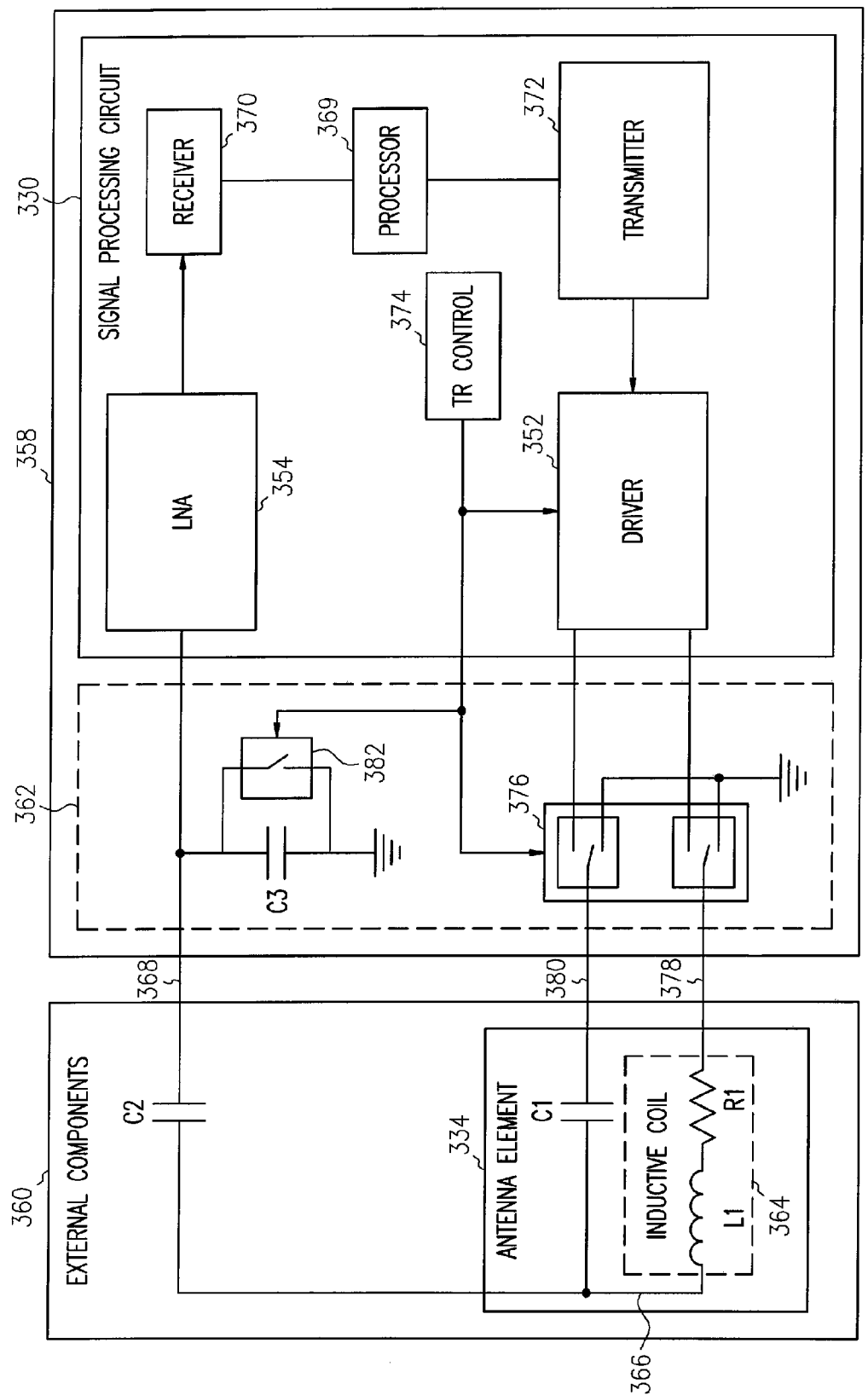
FIG. 3 illustrates portions of a hearing aid device, including a TR switch for an antenna element, according to various embodiments of the present subject matter.

FIG. 3 illustrates portions of a hearing aid device, including a TR switch for an antenna element, according to various embodiments of the present subject matter. The illustration includes representations for an integrated circuit (IC) portion 358 and for external components 360 with respect to the IC portion. The IC portion 358 includes the signal processing circuit 330 and a TR switch 362.

The external components 360 include the antenna element 334. The antenna element includes an inductive coil 364, represented by an inductor (L1) in series with a resistance (R1) associated with the resistance in the coil. The resistance R1 can also represent other resistances, such as the resistance in the lines or current limiting resistors. The antenna element 334 also includes a tuning capacitor (C1) connected to the inductive coil at a node 366, also referred to as a center point or a signal pickup node. When the antenna element 334 receives a signal from an inductive source, a voltage is induced at the node 366. This voltage is presented to a low noise amplifier 354 in the IC 358 through a DC blocking capacitor (C2). The voltage of a received signal applied to the input 368 of the amplifier 354 is in the microvolt to minivolt range, and thus will not damage the IC 358. However, the voltage at the node 366 is several time higher than a maximum IC voltage rating (depending on the Q-factor) when a current is driven through the inductive coil 364 to transmit a signal from the antenna element 334. As is described in detail below, aspects of the present subject matter provides means to protect the IC from this high voltage.

The illustrated IC 358 includes a low noise amplifier 354 to receive an induced signal from the antenna element 334, and a driver 352 to drive a current through the inductive coil 364 of the antenna element 334 and transmit an inductive signal from the antenna element. The illustrated IC signal processing circuit 330 further includes a processor 369 in communication with a receiver 370 to process received signals from the amplifier 354, and in communication with a transmitter 372 to present a signal to the driver 352 that is to be driven through the inductive coil 364 of the antenna element 334. The illustrated signal processing circuit includes a TR control 374 to enable the driver, and to appropriately actuate the TR switch 362 to either transmit signals to the antenna element 366 in a transmit mode or receive signals from the antenna element 366 in a receive mode.

The illustrated TR switch functions to configure the antenna element 334 in series in the transmit mode and in parallel in the receive mode, and further functions to protect the IC from the large voltages generated at the node 366 during the transmit mode by shunting a capacitance (C3) associated with the IC. A first portion 376 of the TR switch 362 is responsive to the TR control signal to operatively connect the driver 352 to the antenna element 334 during the transmit mode, and connect a first terminal 378 of the antenna element to a second terminal 380 of the antenna element to place the tuning capacitor (C1) in parallel with the inductive coil 364 during the receive mode. In various embodiments, the first and second terminals 378 and 380 of the antenna element are connected to ground during the receive mode. A second portion 382 of the TR switch 362 is responsive to the TR control signal to form a shunt across the IC capacitance (C3) to protect the IC during the transmit mode.

Figure 4:
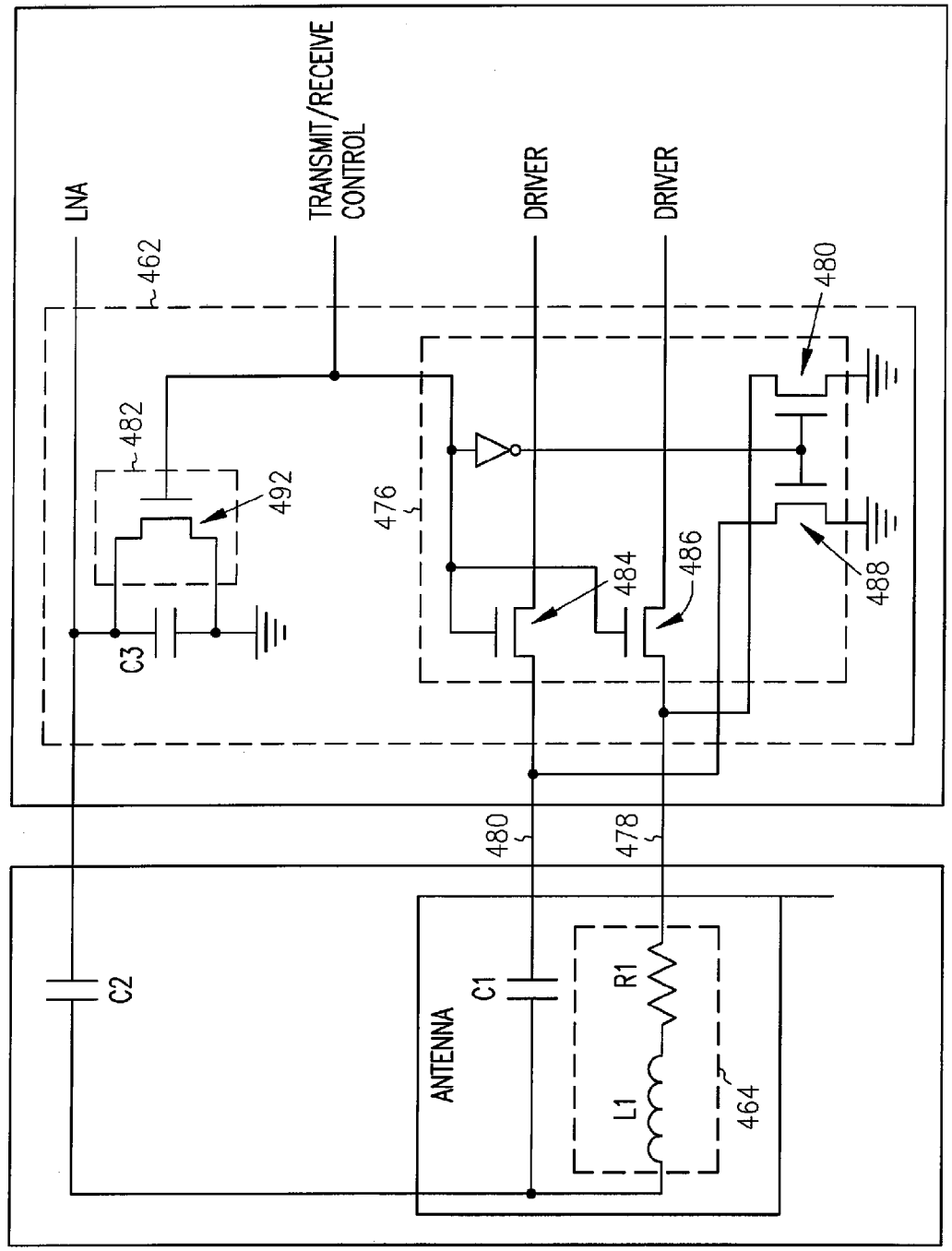
FIG. 4 illustrates the TR switch and the antenna element of FIG. 3, according to various embodiments of the present subject matter.

FIG. 4 illustrates the TR switch and the antenna element of FIG. 3, according to various embodiments of the present subject matter. In various embodiments, the first portion 476 of the TR switch 462 includes a first and second pass transistors 484 and 486 to selectively connect the driver to the antenna element during the transmit mode, and further includes a first and second pull-down transistors 488 and 490 to selectively ground the first and second terminals 478 and 480 of the antenna element during the receive mode. The gates of the first and second pass transistors and the first and second pull-down transistors are appropriately connected to the TR control signal to perform the desired function. The illustrated first portion of the TR switch is an embodiment, and is not intended to be the only design for a TR switch. Those of ordinary skill in the art will appreciate, upon reading and comprehending this disclosure, that there are other circuits that can be designed to perform the function of the first portion of the TR switch. Other circuits are capable of selectively connecting the driver to the antenna so that the components of the antenna are in series, and are capable of selectively disconnecting the driver from the antenna and connecting the tuning capacitor (C1) in parallel across the inductive coil 464. In various embodiments, the second portion 482 of the TR switch 462 includes a bypass transistor 492 connected across the IC capacitance (C3). The gate of the bypass transistor is appropriately connected to the TR control to perform the desired function.

Figure 5:
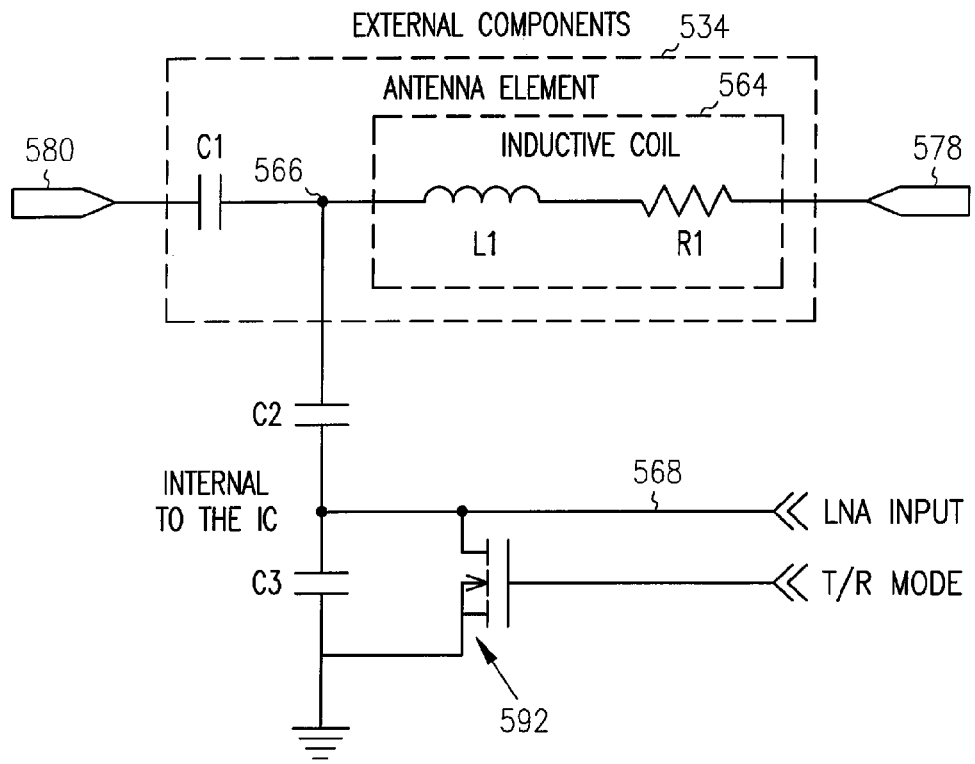
FIG. 5 is a schematic illustration of the antenna element and a portion of the TR switch of FIG. 4.

FIG. 5 is a schematic illustration of the antenna element and a portion of the TR switch of FIG. 4. The antenna element 534 includes the inductive coil 564 (L1 and R1) and the tuning capacitor (C1). A first terminal 578 of the antenna element is connected to the inductive coil, and a second terminal 580 of the antenna element is connected to the tuning capacitor (C1). The tuning capacitor is connected to the inductive coil at a node of the antenna element. The node is connected to an input 568 of the low noise amplifier via the DC blocking capacitor (C2). The input 568 of the amplifier is associated with an IC capacitance (C3). A bypass transistor 592 is connected across the IC capacitance, and is responsive to a TR control signal to selectively pull the amplifier input to ground to protect the IC from the high voltages generated at the node of the antenna element when a current is driven through the inductive coil.

Figure 6:
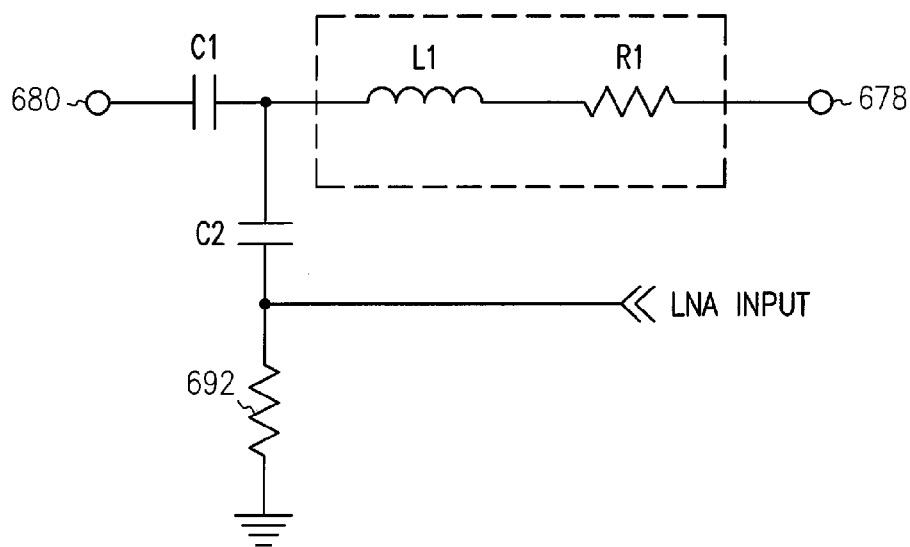
FIG. 6 illustrates the antenna element arranged in a transmit mode, according to various embodiments of the present subject matter.
Figure 7:
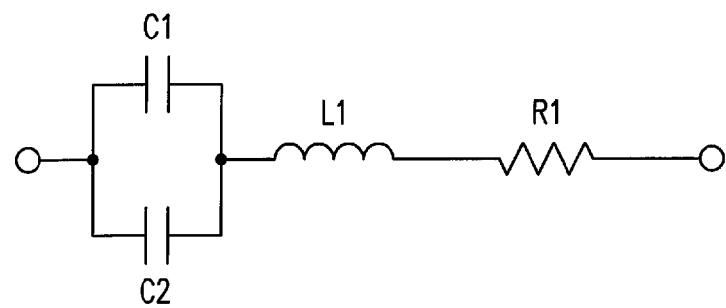
FIG. 7 is a simplified circuit schematic illustrating the arrangement of the antenna element in the transmit mode of FIG. 6.
Figure 8:
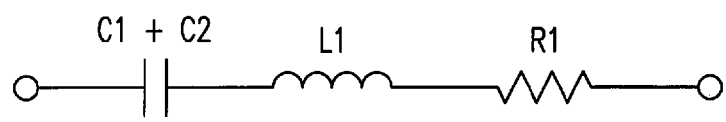
FIG. 8 is a further simplified circuit schematic, illustrating the series resonant circuit of the antenna element of FIG. 6 in the transmit mode.

The present subject matter transforms the arrangement of components in the antenna element to a first arrangement in a transmit mode and to a second arrangement in a receive mode. FIGS. 6-8, described below, illustrate the circuit of FIG. 5 in a transmit mode. FIGS. 9-12, described below, illustrate the circuit of FIG. 5 in a receive mode.

FIG. 6 illustrates the antenna element arranged in a transmit mode, according to various embodiments of the present subject matter. FIG. 6 is similar to the illustration shown in FIG. 5. At least one, and in the illustrated embodiment both the first and second terminals 678 and 680 of the antenna element are connected to a driver. The bypass transistor illustrated in FIG. 5 is actuated to conduct current and shunt the IC capacitance in the transmit mode. The actuated transistor is associated with a small resistance, as represented at 692. The actuated transistor prevents a large voltage from being presented to the input of the low noise amplifier.

FIG. 7 is a simplified circuit schematic illustrating the arrangement of the antenna element in the transmit mode of FIG. 6. The transistor resistance 692 is small, and so it is not shown. The tuning capacitor (C1) and the bypass capacitor (C2) are illustrated to be connected in parallel.

FIG. 8 is a further simplified circuit schematic, illustrating the series resonant circuit of the antenna element of FIG. 6 in the transmit mode. The equivalent capacitance of the parallel capacitors (C1) and (C2) illustrated in FIG. 7 is C1+C2. FIG. 8 illustrates a series resonant circuit. The resonance frequency ($F_{TX}$) is provided by the following equation:

$$F_{TX} = \frac{1}{2 \times \pi \times \sqrt{L1 \times (C1 + C2)}}.$$

The bypass capacitor C2 is much smaller than the tuning capacitor C1, such that the resonant frequency is mostly attributable to the tuning capacitor:

$$F_{TX} \approx \frac{1}{2 \times \pi \times \sqrt{L1 \times C1}}.$$

Figure 9:
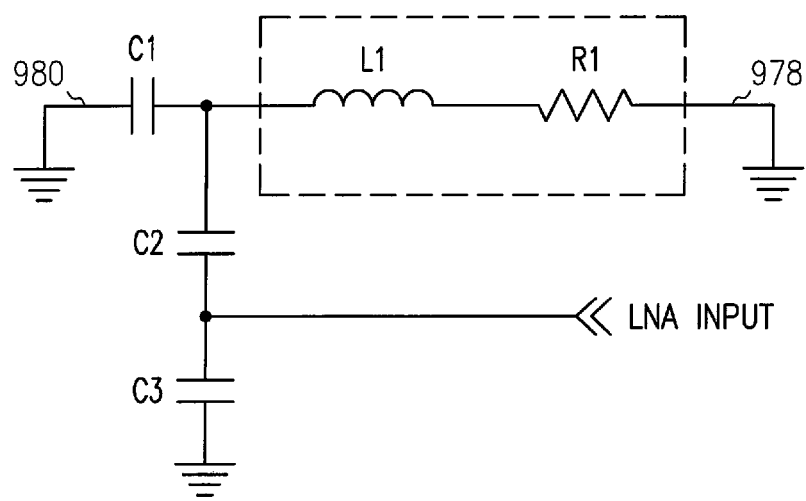
FIG. 9 illustrates the antenna element arranged in a receive mode, according to various embodiments of the present subject matter.

FIG. 9 illustrates the antenna element arranged in a receive mode, according to various embodiments of the present subject matter. FIG. 9 is similar to the illustration shown in FIG. 5. The bypass transistor illustrated in FIG. 5 is not actuated in the receive mode, thus the IC capacitance (C3) is shown. Additionally, in the illustrated embodiment, the first and second terminals 978 and 980 of the antenna element are grounded.

Figure 10:
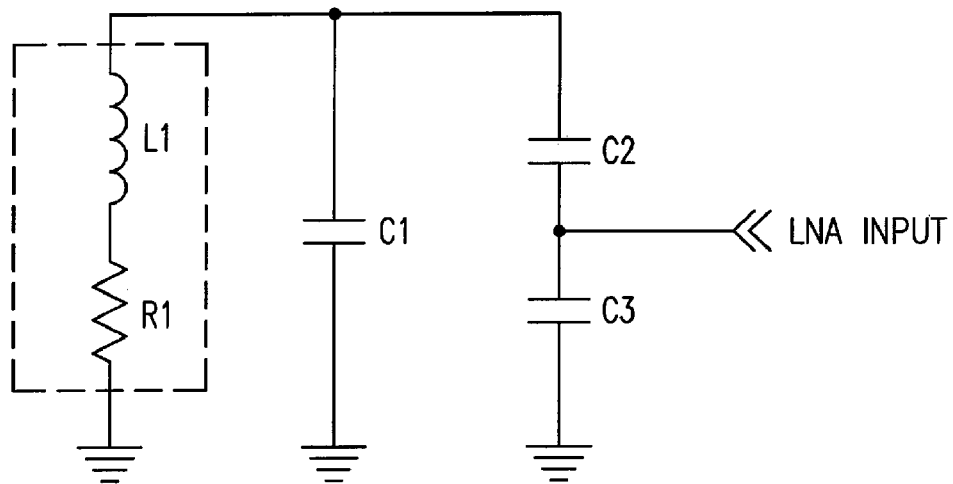
FIG. 10 is another illustration of the circuit of FIG. 9.

FIG. 10 is another illustration of the circuit of FIG. 9. FIG. 10 clearly illustrates that the inductive coil (L1 and R1) and the tuning capacitor (C1) are connected in parallel. Additionally, the series combination of the bypass capacitor (C2) and the IC capacitance (C3) are connected in parallel across the tuning capacitor (C1) from the node of the antenna element to ground. The bypass capacitor (C2) and the IC capacitance (C3) function as a voltage divider. It is desired to present a large signal to the input of the amplifier; and thus it is desired that the voltage drop across the IC capacitance (C3) is much large than the voltage drop across the bypass capacitor (C2). Since the voltage drop across each of the capacitors (C2 and C3) is inversely proportional to the capacitance, it is desirable for the bypass capacitor (C2) to be much larger than the IC capacitance (C3). It was determined earlier that the tuning capacitor (C1) was much larger than the bypass capacitor (C2). Thus, a desired relationship between C1, C2 and C3 is: C3<<C2 <<C1. However, this relationship is not always achievable.

Figure 11:
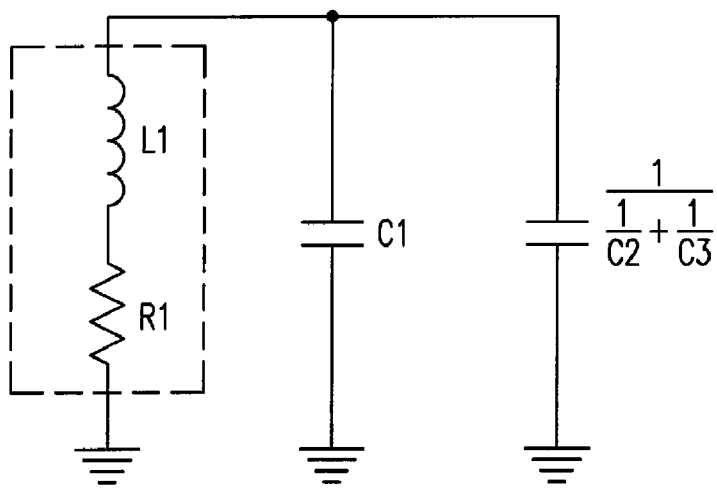
FIG. 11 is a simplified circuit schematic illustrating the arrangement of the antenna element in the receive mode of FIG. 9.

FIG. 11 is a simplified circuit schematic illustrating the arrangement of the antenna element in the receive mode of FIG. 9. The equivalent capacitance of C2 and C3 is represented by:

$$\frac{1}{\frac{1}{C2} + \frac{1}{C3}} = \frac{C2 \times C3}{C2 + C3}.$$

Figure 12:
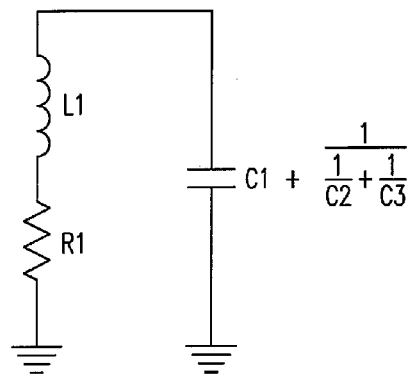
FIG. 12 is a further simplified circuit schematic illustrating the arrangement of the antenna element in the receive mode of FIG. 9.

FIG. 12 is a further simplified circuit schematic illustrating the arrangement of the antenna element in the receive mode of FIG. 9. The overall equivalent capacitance is represented by:

$$C1 + \cfrac{1}{\cfrac{1}{C2} + \cfrac{1}{C3}} = C1 + \cfrac{C2 \times C3}{C2 + C3}.$$

The resonance frequency ($F_{TX}$) is provided by the following equation:

$$F_{TX} = \cfrac{1}{2 \times \pi \times \sqrt{L1 \times \left(C1 + \cfrac{1}{\cfrac{1}{C2} + \cfrac{1}{C3}}\right)}}.$$

Since C3<<C2<<C1, the resonant frequency is mostly attributable to the tuning capacitor:

$$F_{TX} \approx \cfrac{1}{2 \times \pi \times \sqrt{L1 \times C1}}.$$

There is little frequency shift between the receive and transmit modes. Thus, a high Q factor is maintained.

The TR switch of the present subject matter allows the magnetic induction based communication system to switch between the series resonant circuit in the transmit mode and the parallel resonant circuit in the receive mode. The TR switch allows the same inductor and capacitors to be used in both the transmit mode and the receive mode. Thus, the present subject matter provides the advantages associated with transmitting signals using a series resonant circuit and receiving signals using a parallel resonant circuit without significantly increasing the space or cost of the communication system. In the transmit mode, the first and second terminals of the antenna element are connected to a driver operating in a switching mode to drive the series resonant circuit that includes L1, C1 and C2. The series configuration allows high current to be injected into the inductor coil. The parasitic IC pad capacitance C3 is shunted through the transistor switch to prevent higher voltage at the pad than the maximum rated value. The voltage at the center point node between L1 and C1 is amplified, resulting in voltage higher than the maximum rated IC voltage.

In receive mode, both the first and second terminals are connected to ground to create a parallel resonant circuit that includes L1 and C1. The capacitor C2 is used as the DC blocking capacitor to the low noise amplifier. The voltage at the coil is loaded by a large impedance to prevent signal degradation, allowing a large signal to be presented at the input of the amplifier.

Figure 13:
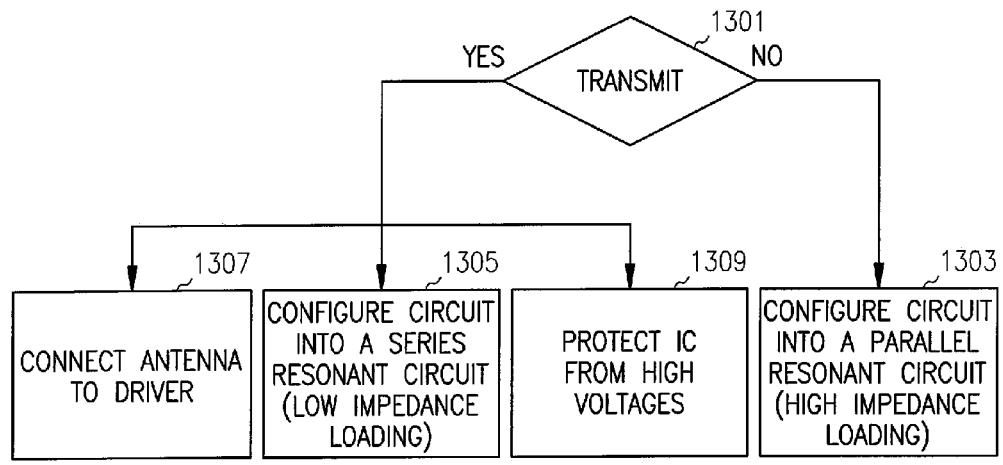
FIG. 13 illustrates a transmit-receive process, according to various embodiments of the present subject matter.

FIG. 13 illustrates a transmit-receive process, according to various embodiments of the present subject matter. In various embodiments, this process is performed by the TR switch and the signal processing circuit, which can be used to provide the TR control signal. In various embodiments, the communication system may default to either the transmit mode or the receive mode. In the illustrated process, the communication system has a receive mode default such that the induction communication system is able to receive an induction signal. However, the present subject matter is not so limited, as other logical arrangements of the illustrated process will be known to those of ordinary skill in the art upon reading and comprehending this disclosure.

At 1301, it is determined if the induction communication system is in a transmit mode. If the system is not in a transmit mode, the system is assumed to be in a receive mode, and at 1303, the components of the antenna element are configured into, or are maintained in, a parallel resonant circuit, as shown and described above. The parallel resonant circuit provides the antenna element with high impedance loading to reduce signal degradation of the induced signal presented to the amplifier input. If at 1301 the system is in a transmit mode, the components of the antenna element are configured into a series resonant circuit at 1305. The series resonant circuit provides the antenna element with low impedance loading to enhance the current and the power dissipation in the inductive coil. In various embodiments of the present subject matter, at 1307 the antenna element is operably connected to the driver when the system is in a transmit mode. In various embodiments of the present subject matter, at 1309 the antenna element protects the integrated circuit from high voltages generated in the transmit mode.

One of ordinary skill in the art will understand, upon reading and comprehending this disclosure, that the present subject matter is capable of being incorporated in a variety of near-field communication systems and technology that use such near-field communication systems such as hearing aids. For example, the present subject mater is capable of being used in hearing aids such as in-the-ear, half-shell and in-the-canal styles of hearing aids, as well as for behind-the-ear hearing aids. Furthermore, one of ordinary skill in the art will understand, upon reading and comprehending this disclosure, the method aspects of the present subject matter using the figures presented and described in detail above.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

What is claimed is:

1. An apparatus for use within a communication system having an antenna circuit with an inductive coil and a tuning capacitor connected to the inductive coil at a node, wherein the communication system further includes an amplifier connected to the node through a DC blocking capacitor to receive an induced signal in the inductive coil in a receive mode, and a driver connected to the antenna circuit to energize the inductive coil with a driven signal in a transmit mode, the apparatus comprising:

means to transform the inductive coil, the tuning capacitor and the DC blocking capacitor into a series resonant circuit to reduce an inductive load in the transmit mode; and means to transform the inductive coil, the tuning capacitor and the DC blocking capacitor into a parallel resonant circuit to increase an inductive load in the receive mode.

2. The apparatus of claim 1, further comprising means to protect integrated circuitry (IC) from high voltages at the node of the antenna circuit in the transmit mode.

3. The apparatus of claim 2, wherein the means to protect integrated circuitry (IC) from high voltages includes an IC shunt switch to selectively couple the DC blocking capacitor to a reference potential.

4. The apparatus of claim 1, wherein the means to transform the inductive coil, the tuning capacitor and the DC blocking capacitor into a series resonant circuit includes means to connect the DC blocking capacitor in parallel across the tuning capacitor to form the series resonant circuit.

5. The apparatus of claim 1, wherein the means to transform the inductive coil, the tuning capacitor and the DC blocking capacitor into a parallel resonant circuit includes means to connect the inductive coil in parallel across the tuning capacitor and in parallel across a capacitance of the DC blocking capacitor in series with an IC capacitance.

6. The apparatus of claim 1, wherein the antenna circuit has a first terminal connected to the inductive coil and a second terminal connected to the tuning capacitor, and the means to transform the inductive coil, the tuning capacitor and the DC blocking capacitor into a parallel resonant circuit to increase an inductive load in the receive mode includes a terminal switch to ground the first terminal and the second terminal.

7. An apparatus for use within a communication system having an antenna circuit with a first terminal, a second terminal, a node, an inductive coil connected between the first terminal and the node, and a tuning capacitor connected between the second terminal and the node, the communication system further including an amplifier connected to the node through a DC blocking capacitor to receive an induced signal in the inductive coil in a receive mode, and a driver connected to the antenna circuit to energize the inductive coil with a driven signal in a transmit mode, the apparatus comprising:
a first switch to:
connect the first terminal and the second terminal of the antenna circuit to a reference potential in the receive mode such that the inductive coil is connected in parallel across the tuning capacitor; and
connect the antenna circuit to the driver in the transmit mode; and
a second switch connected to a node between the DC blocking capacitor and the amplifier to shunt an integrated circuit (IC) capacitance in the transmit mode to protect the amplifier from high voltages generated at the node in the transmit mode.

8. The apparatus of claim 7, wherein the first switch is adapted to ground the first terminal and the second terminal.

9. The apparatus of claim 7, wherein the TR switch is adapted to switch between transmitting and receiving inductive signals for a wireless hearing aid.

10. A communication system, comprising:
an antenna element having a first terminal, a second terminal and a node, the antenna element including an inductive coil connected between the first terminal and the node and a tuning capacitor connected between the second terminal and the node;
a DC blocking capacitor connected to the node of the antenna element;
integrated circuitry, including:
an amplifier connected to the node of the antenna through the DC blocking capacitor to receive a first communication signal induced in the inductive coil in a receive mode;
a driver to energize the inductive coil with a second communication signal in a transmit mode; and
a transmit-receive switch (TR switch) responsive to a control signal to:
pull the first and second terminals of the antenna element to a reference potential during the receive mode; and
operably connect the driver to at least one of the first and second terminals of the antenna element, and energize the inductive coil during the transmit mode.

11. The communication system of claim 10, wherein the TR switch is responsive to the control signal to ground the first and second terminal of the antenna element during the receive mode.

12. The communication system of claim 10, further comprising a shunt switch responsive to the control signal to ground a node between the DC blocking capacitor and the amplifier during the transmit mode.

13. The communication system of claim 10, further comprising signal processing circuitry connected to the amplifier to receive an amplified signal representative of the first communication signal, and connected to the driver such that the driver is able to energize the inductive coil with the second communication signal.

14. The communication system of claim 10, wherein the signal processing circuitry is adapted to provide the control signal indicative of the transmit mode and the receive mode.

15. The communication system of claim 10, wherein the communication system is incorporated in a wireless hearing aid and is adapted to inductively communicate with inductive devices.

16. A hearing aid, comprising:
a hearing aid receiver to present sound to an ear;
a microphone system to receive acoustic signals;
an antenna element to transmit and receive inductive signals, the antenna element including:
a first terminal, a second terminal and a node;
an inductive coil connected between the first terminal and the node; and
a tuning capacitor connected between the second terminal and the node;
a DC blocking capacitor connected to the node of the antenna element; and
signal processing circuitry connected to the microphone system to process received acoustic signals and present the processed signals to the hearing aid receiver, and connected to the antenna element to process the received inductive signals, the signal processing circuitry including a transmit-receive switch responsive to a control signal to configure the antenna element in a parallel resonant circuit in a receive mode, and to configure the antenna element in a series resonant circuit in a transmit mode.

17. The hearing aid of claim 16, wherein the transmit-receive switch includes:
a first switch to connect the first terminal and the second terminal of the antenna circuit to a reference potential in the receive mode such that the inductiVe coil is connected in parallel across the tuning capacitor; and
a second switch connected to a node between the DC blocking capacitor and the amplifier to shunt an integrated circuit (IC) capacitance in the transmit mode to protect the signal processing circuitry from high voltages generated at the node in the transmit mode.

18. The TR switch of claim 17, wherein the first switch is adapted to ground the first terminal and the second terminal in the receive mode.

19. A method for switching between a transmit mode and a receive mode in a wireless communication system having a single antenna element with a single resonant circuit and a DC blocking capacitor connected between an amplifier and a node of the antenna element, the method comprising:

determining a mode of operation for the communication system;

transforming the single resonant circuit of the antenna element into a high-impedance parallel resonant circuit in a receive mode; and transforming the single resonant circuit of the antenna element into a low-impedance series resonant circuit in a transmit mode.

20. The method of claim 19, wherein transforming the single resonant circuit of the antenna element into a high-impedance parallel resonant circuit in the receive mode includes grounding a first terminal and a second terminal of the antenna element.

21. The method of claim 19, wherein transforming the single resonant circuit of the antenna element into a high-impedance parallel resonant circuit in the receive mode includes connecting an inductive coil in parallel across a tuning capacitor and in parallel across an equivalent capacitance for both the DC blocking capacitor and an integrated circuit (IC) capacitance.

22. The method of claim 19, wherein transforming the single resonant circuit of the antenna element into a low-impedance series resonant circuit in the transmit mode includes connecting an inductive coil in series with a tuning capacitor and the DC blocking capacitor.

23. The method of claim 19, wherein transforming the single resonant circuit of the antenna element into a low-impedance series resonant circuit in the transmit mode includes connecting the DC blocking capacitor between the node of the antenna element and ground in the transmit mode.

24. The method of claim 19, wherein the mode of operation for the communication system defaults to the receive mode.

25. The method of claim 19, wherein:

the high-impedance parallel resonant circuit has a parallel resonant frequency;

the low-impedance series resonant circuit has a series resonant frequency; and the parallel resonant frequency is approximately equal to the series resonant frequency.

26. The method of claim 19, wherein:

the antenna element includes an inductor component and a tuning capacitor component;

transforming the single resonant circuit of the antenna element into the high-impedance parallel resonant circuit in the receive mode includes connecting the inductor component and the tuning capacitor component in parallel; and transforming the single resonant circuit of the antenna element into the low-impedance series resonant circuit in the transmit mode includes connecting the inductor component and the tuning capacitor component in series.

* * * * *